(12) United States Patent
Bonsi et al.

(10) Patent No.: US 12,203,567 B2
(45) Date of Patent: Jan. 21, 2025

(54) BALL VALVE

(71) Applicants: Aldo Bonomi, Lumezzane (IT); Carlo Bonomi, Lumezzane (IT)

(72) Inventors: Paolo Bonsi, Pezzaze (IT); Claudio Gattavari, Bagnacavallo (IT); Marco Tassotto, Borgosatollo (IT)

(73) Assignees: Aldo Bonomi, Lumezzane (IT); Carlo Bonomi, Lumezzane (IT)

( * ) Notice: Subject to any disclaimer, the term of this patent is extended or adjusted under 35 U.S.C. 154(b) by 16 days.

(21) Appl. No.: 18/254,866

(22) PCT Filed: Nov. 23, 2021

(86) PCT No.: PCT/IB2021/060840
§ 371 (c)(1),
(2) Date: May 29, 2023

(87) PCT Pub. No.: WO2022/118134
PCT Pub. Date: Jun. 9, 2022

(65) Prior Publication Data
US 2024/0003435 A1    Jan. 4, 2024

(30) Foreign Application Priority Data

Dec. 3, 2020 (IT) .................. 102020000029666

(51) Int. Cl.
*F16K 5/06* (2006.01)
*F16K 27/06* (2006.01)
(Continued)

(52) U.S. Cl.
CPC .......... *F16K 5/0626* (2013.01); *F16K 5/0605* (2013.01); *F16K 5/0647* (2013.01);
(Continued)

(58) Field of Classification Search
CPC .... F16K 5/0626; F16K 5/0605; F16K 5/0647; F16K 31/041
See application file for complete search history.

(56) References Cited

U.S. PATENT DOCUMENTS 3,157,190 A    11/1964 Herbert
3,542,056 A *  11/1970 Chinn ................... F16K 39/022
                                                        137/271
(Continued)

FOREIGN PATENT DOCUMENTS

CN    110185813 A    8/2019

OTHER PUBLICATIONS

International search report and written opinion issued by the EPO for PCT/IB2021/060840 on Feb. 23, 2022.

*Primary Examiner* — Paul J Gray (57) ABSTRACT

A ball valve (10) is described comprising a valve body (12) in which an axial channel (14) for the unidirectional flow of a fluid is obtained. The axial channel (14) extends between an inlet port (11) and an outlet port (13) for the fluid, wherein the ports are axially aligned with the axis of the axial channel (14). The valve is provided with a motorized actuator (20) for adjusting the position of the fluid adjusting ball (15) and comprises a head block (17) for installing the motorized actuator (20) on the valve body (12). The head block (17) includes at least one stem (21) for rotating the ball (15). The valve body (12) has a first window (26) whose axis is coincident with the axis of rotation of the ball (15) and at least one second window (27) whose axis is coincident with the axis of rotation of the ball (15). The first and second windows (26, 27) are symmetrically made in opposite parts of the valve body (12) with respect to the axis of the axial channel (14) and have the same shape and size to receive, on one side, the head block (17) on the valve body (12) and, on the opposite side of the valve body (12), a covering element (Continued)

(18). The head block (17) has an engaging portion (71) having shape and size adapted to allow it to be inserted into the first window (26) or into the second window (27).

12 Claims, 9 Drawing Sheets

(51) Int. Cl.
*F16K 31/04* (2006.01)
*F16K 47/04* (2006.01)

(52) U.S. Cl.
CPC .......... *F16K 27/067* (2013.01); *F16K 31/041* (2013.01); *F16K 47/045* (2013.01)

(56) References Cited

U.S. PATENT DOCUMENTS

| | | | | |
|---|---|---|---|---|
| 5,152,503 | A * | 10/1992 | Conway | F16K 27/067 |
| | | | | 137/271 |
| 5,267,722 | A | 12/1993 | Coulter | |
| 2003/0106216 | A1 | 6/2003 | Yokomi | |
| 2012/0145939 | A1 | 6/2012 | Rimboym et al. | |
| 2015/0247579 | A1* | 9/2015 | Corte, Jr. | F16K 5/0642 |
| | | | | 251/315.1 |
| 2016/0341334 | A1* | 11/2016 | Gattavari | F16K 5/0605 |
| 2017/0146141 | A1 | 5/2017 | Avdjian et al. | |
| 2020/0232575 | A1* | 7/2020 | Dearman | F16K 31/0682 |

\* cited by examiner

BALL VALVE

This application is a U.S. national stage of PCT/IB2021/060840 filed on 23 Nov. 2021, which claims priority to and the benefit of Italian Application No. 102020000029666 filed on 3 Dec. 2020 the contents of which are incorporated herein by reference in their entireties.

FIELD OF THE INVENTION

The present invention relates to a ball valve and, in particular, to a one-way control valve in which the inner ball is rotated by an actuator, for example a motorized actuator.

PRIOR ART

A ball valve of known type generally comprises a valve body in which an axial channel for the flow of a fluid between an inlet port and an outlet port is obtained. A ball, provided with an axial cavity having axis coincident with the axis of the axial channel, is placed along the axial channel and is rotatable around an axis perpendicular to the axis of the axial channel. In order to adjust the fluid flow through the valve, the ball is rotated, for example, by a motorized actuator.

The motorized actuator that is installed on the known ball valves can have large dimensions, even larger than the valves themselves.

In case the valve is a one-way valve, it may be necessary to mount the motorized actuator on one side or on the opposite side of the ball valve, e.g. for reasons of space or plant layout. This is not possible by simply turning the valve, since it is unidirectional. In fact, pressure reducing elements, such as perforated sheets, are inserted into the axial cavity of the ball thus allowing the pressure drops to be divided into several stages, in order to reduce the noise produced by compressible fluids, such as gaseous fluids, or the cavitation phenomena in case of incompressible fluids, such as liquid fluids. In some cases, the ball may have different shapes between the inlet and the outlet of the axial cavity, thus resulting asymmetrical with respect to a plane passing through its axis of rotation.

On the other hand, the conversion operation of an existing valve prearranged for mounting the motorized actuator on one side of the valve, e.g. on the left side, into a valve with the motorized actuator mounted on the opposite side, e.g. on the right side, is very complex.

US2012145939A1 describes a one-way valve according to the preamble of claim 1. In the valve described in this document, the ball rotation is accomplished around an axis horizontal and perpendicular to the axis of the axial channel passing through the valve.

It should be taken into consideration that a liquid or gaseous fluid flowing through the valve may carry suspended solids, debris or, in general, may be a dirty fluid. When the valve is opened, the removal of solids and debris by the fluid that starts to flow through the valve must be ensured or, in any case, facilitated, thus preventing them, in particular, from being introduced into the valve, thus causing possible damage to the ball, seals, bearings or moving parts inside the valve.

SUMMARY OF THE INVENTION

In view of the above, an object of the present invention is to provide a ball valve with unidirectional flow which is prearranged to be easily modified in a valve with the motorized actuator mounted on one side, or on the opposite side, of the valve.

Another object of the present invention is to propose a one-way ball valve of the above mentioned type which can be easily modified by an operator, as regards the mounting side of the motorized actuator, even upon its installation.

It is a further object of the present invention to provide a one-way ball valve of the above mentioned type which allows any suspended solids or debris to be prevented from entering the ball valve, especially during the opening steps of the valve, regardless of the mounting side of the motorized actuator.

Still another object of the present invention is to provide a one-way ball valve of the above mentioned type to facilitate the removal of any suspended solids or debris upstream or downstream of the valve, regardless of the mounting side of the motorized actuator. The present invention, relating a ball valve according to claim 1, achieves these and other objects. Further peculiar characteristics of the present invention are set forth in the dependent claims.

A ball valve generally comprises a valve body in which an axial channel for the unidirectional flow of a fluid, an inlet port for the fluid and an outlet port for the fluid are obtained, wherein the ports have a common axis aligned with the axis of the axial channel. The valve comprises a ball for adjusting the fluid flow through the axial channel, the ball having an axial cavity therein in which pressure reducing elements are arranged and being rotatable by an actuator around an axis perpendicular to the axis of the axial channel. The valve comprises a head block for installing the actuator on the valve body. The head block includes at least one stem for rotating the ball.

According to an embodiment of the present invention, the valve body has a first window whose axis is coincident with the axis of rotation of the ball and at least one second window whose axis is coincident with the axis of rotation of the ball. The first and second windows are symmetrically made in opposite parts of the valve body with respect to the axis of the axial channel and have the same shape and size to receive, on one side, the head block on the valve body and, on the opposite side of the valve body, a covering element. The head block has an engaging portion having shape and size adapted to allow it to be inserted indifferently into the first window or into the second window.

With this configuration the installation direction of the actuator, for example a motorized actuator, can be changed on one side or the other of the valve, while maintaining the same direction of rotation of the ball. This allows the ball to be always rotated in the same direction so that any solid bodies or debris are removed when the valve is opened.

Similarly, the covering element has an engaging portion having shape and size adapted to allow it to be inserted indifferently into the first window or the second window.

Therefore, the ball may comprise a first hub having an inner grooved portion adapted to receive a correspondingly shaped end of the stem in order to be rotationally driven by the actuator and, in a diametrically opposite position, a second hub having an inner grooved portion that has the same shape and size of the grooved portion of the first hub. This way, the actuator can be mounted on any of the two sides, thus ensuring that the stem of the head block can be engaged in a grooved portion, so as to ensure the rotation of the ball. This prevents the ball from having to be removed from the valve body and reassembled in the opposite direction when the actuator is installed on one side rather than the other, or vice versa.

The flange for mounting the actuator motor is preferably installed on the head block and integral therewith. The actuator is mechanically connected to the stem of the head block with a key to impart the rotation to the ball.

The flange includes a semicircular recess around the stem to allow the key to be rotated through an angle of 180°.

If the actuator is mounted on either side of the valve, e.g. on the left side, at least one stop element for the key can be positioned in the semicircular recess. The stop element allows the rotation of the stem to be limited between a 0° position corresponding for example to the maximum opening of the valve, and a −90° position corresponding to the closed position of the valve.

If the actuator is mounted on the other side of the valve, e.g. on the right side, at least one stop element for the key can be positioned in the semicircular recess. In this case, the stop element allows the rotation of the stem to be limited between a 0° position corresponding for example to the maximum opening of the valve, and a +90° position corresponding to the closed position of the valve.

In an embodiment of the ball valve according to the present invention, the pressure reducing elements may comprise perforated plates which can be inserted into the axial cavity of the ball to divide into several stages the pressure drop of the fluid as it passes through the axial cavity of the ball.

In an embodiment of the ball valve according to the present invention, the pressure reducing elements in the ball may further comprise a perforated sheet which faces the inlet port of the valve.

In summary, the valve proposed according to the present invention is always mounted so that the stem axis is horizontal, i.e. with the stem positioned at 3 o'clock or 9 o'clock when looking at the valve frontally from the fluid inlet port. Any debris or solid bodies are then deposited at the bottom of the axial channel of the valve and can be removed by the fluid when the valve is opened, thus preventing the valve moving parts, seals and/or bearings from being damaged.

Preferably, during the opening step of the valve according to the present invention, the ball is to be always rotated from bottom upwards when observing the ball from the side of the inlet port. This means that the ball has to be rotated counterclockwise if the actuator is mounted on the left side of the valve, or clockwise if the actuator is mounted on the right side of the valve. This prevents the valve from being damaged if debris is present in the fluid that the valve must intercept or adjust.

BRIEF DESCRIPTION OF THE DRAWINGS

Further characteristics and advantages of the present invention will be more evident from the following description, made for illustration purposes only and without limitation, referring to the accompanying schematic drawings, in which.

MODE FOR CARRYING OUT THE INVENTION

Figure 1:
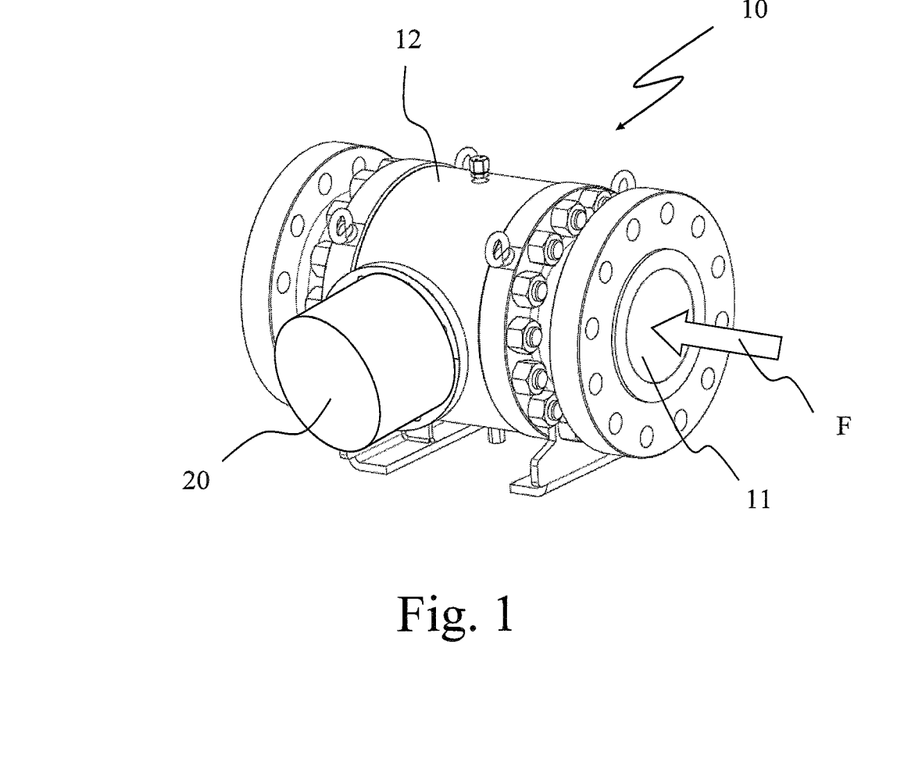
FIG. 1 is a perspective view of an embodiment of a ball valve provided with an actuator installed on the left side with respect to the fluid flow.

A valve 10 having a valve body 12 is shown in FIG. 1. An actuator 20 is mounted on the left side of the valve 10 with respect to the unidirectional flow of the fluid indicated by the arrow F.

Figure 2:
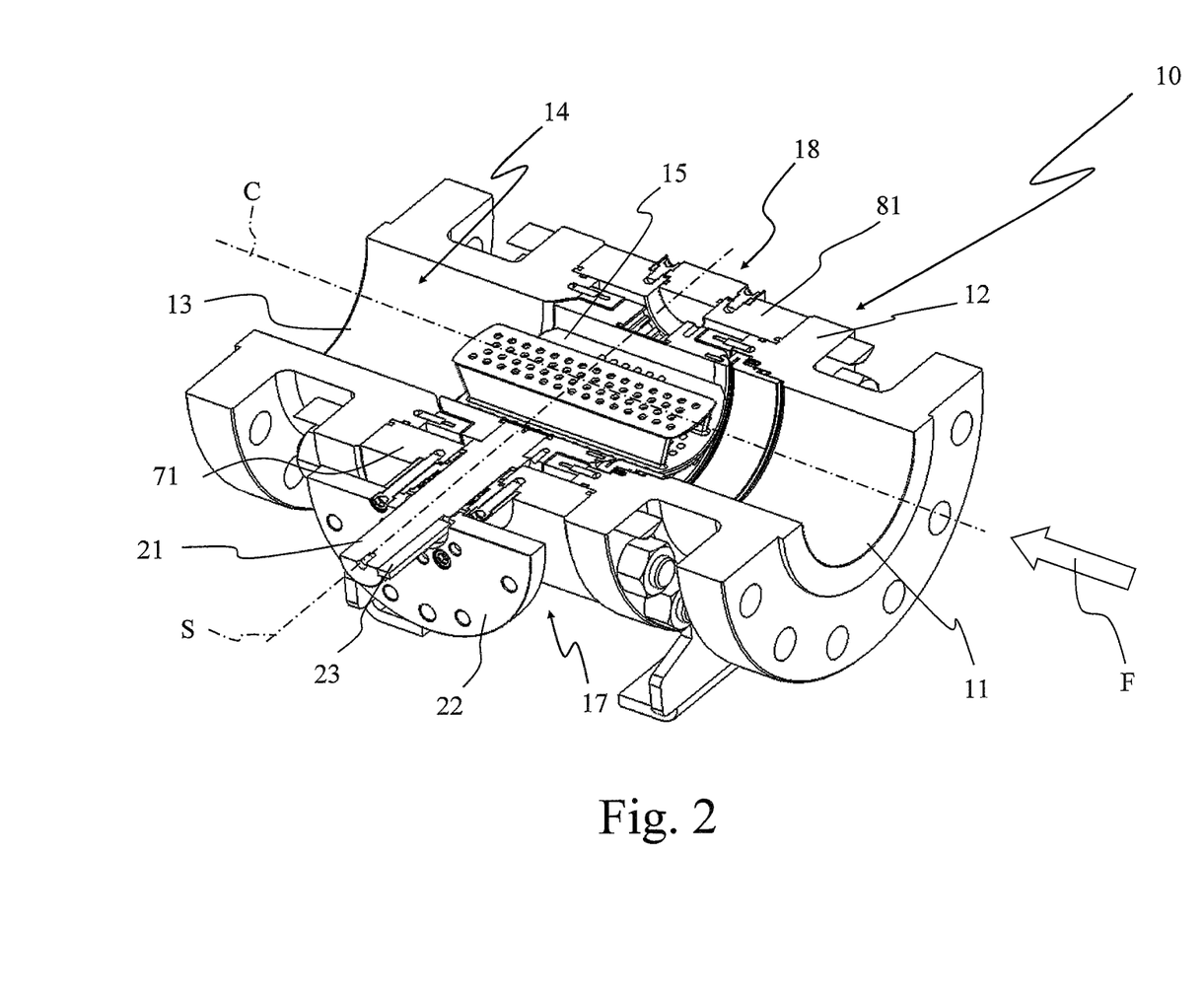
FIG. 2 is a sectional view of the valve of FIG. 1, without actuator, with respect to a plane passing through the axis of the axial channel.

FIG. 2 is a sectional view of the valve of FIG. 1 according to a plane passing through the axis C of the axial channel 14 and through the axis of rotation S of the ball 15. The actuator 20, for example a motorized actuator, is not shown here in order to highlight the elements the valve 10 is composed of.

The valve body 12 comprises an inlet port 11 and an outlet port 13 which are aligned with the axis C of the axial channel 14. The ball 15 is installed along the axial channel 14 to adjust the fluid flow through the same axial channel 14. The ball 15 has an inner axial cavity 16 (FIGS. 6-8) and is rotatable around the axis S perpendicular to the axis C of the axial channel 14.

The valve 10 has a head block 17 which is mounted on a first window 26 of the valve body 12 and, on the opposite side, a covering element 18 mounted on a second window 27 of the valve body 12. The head block 17 has an engaging portion 71 having shape and size adapted to allow it to be inserted indifferently into the first window 26 or into the second window 27. Similarly, the covering element 18 has an engaging portion 81 having shape and size adapted to allow it to be inserted indifferently into the first window 26 or the second window 27.

Figure 5:
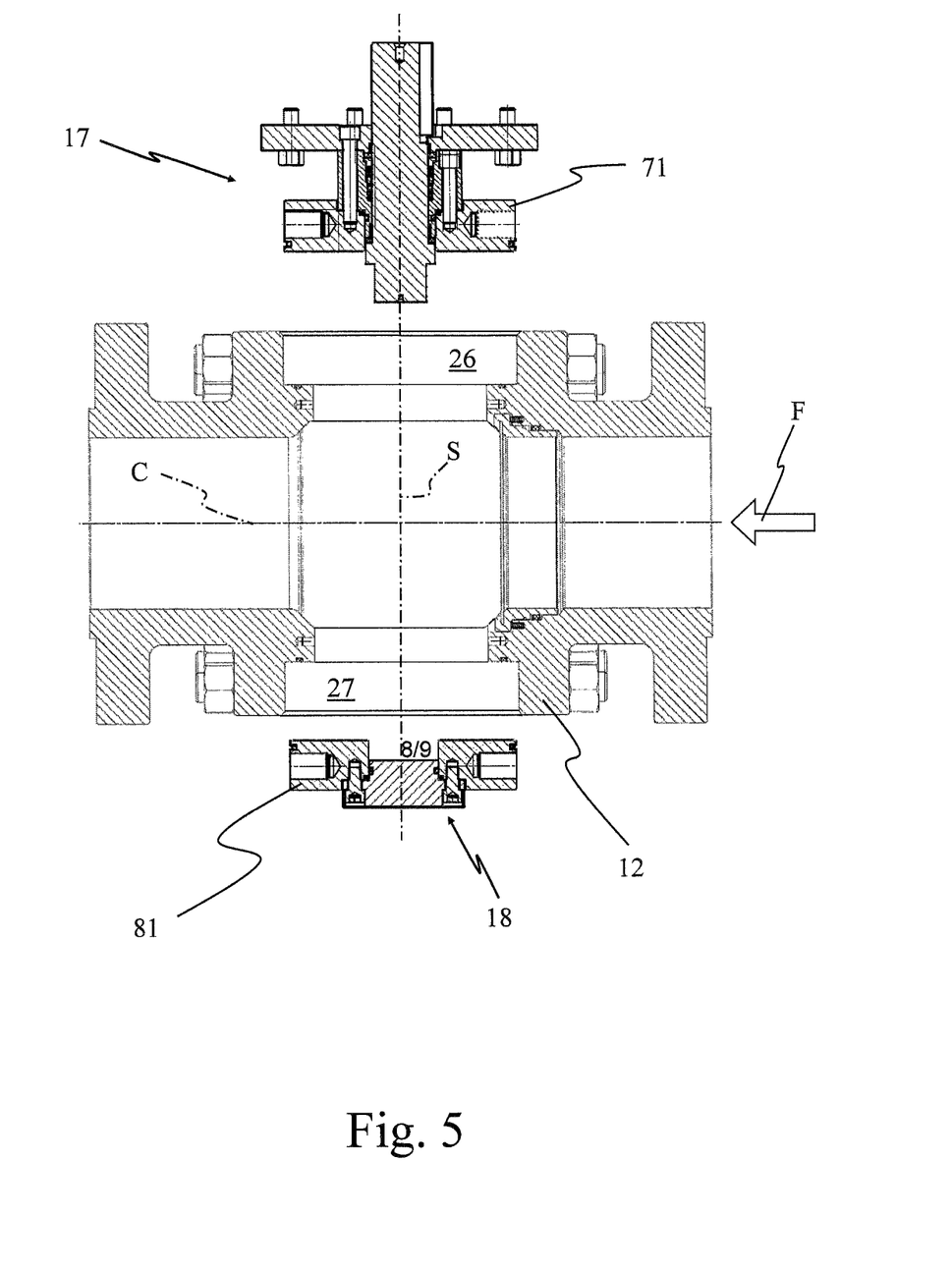
FIG. 5 is a sectional view with respect to the V-V plane of the valve shown in FIG. 4 without the ball, with the head block and covering element removed from the valve body.

Both the first window 26 and the second window 27, clearly visible in FIG. 5, have an axis coincident with the axis of rotation S of the ball and are obtained symmetrically in opposite parts of the valve body 12 with respect to the axis C of the axial channel 14.

The head block 17 includes a stem 21 rotatable around the axis S with respect to the head block 17 for rotating the ball 15 and a flange 22 integral with the head block 17, for installing the actuator 20 on the valve 10. The mechanical connection between the actuator 20 and the stem 21 is made by means of a key 23.

Figure 2A:
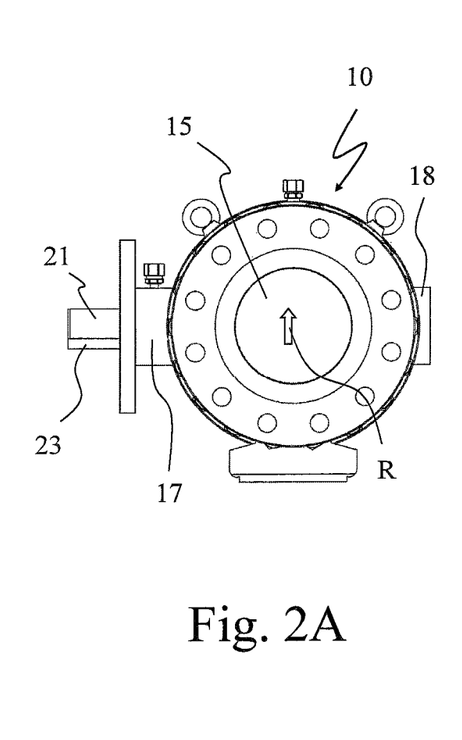
FIGS. 2A, 2B, 2C are schematic views of the valve shown in FIG. 2 which depict various positions of the ball when viewed from the fluid inlet port.
Figure 2B:
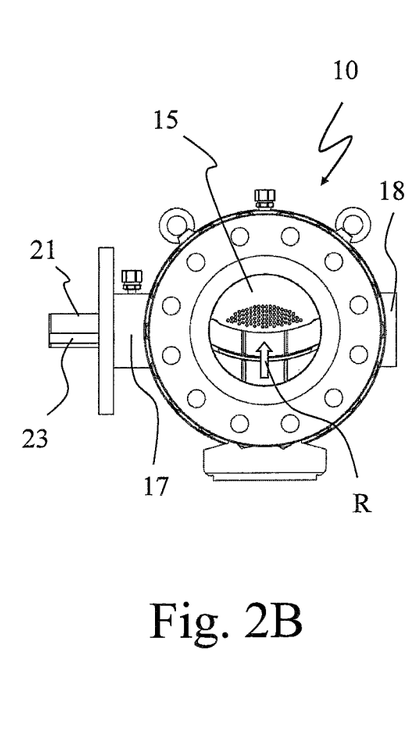
Figure 2C:
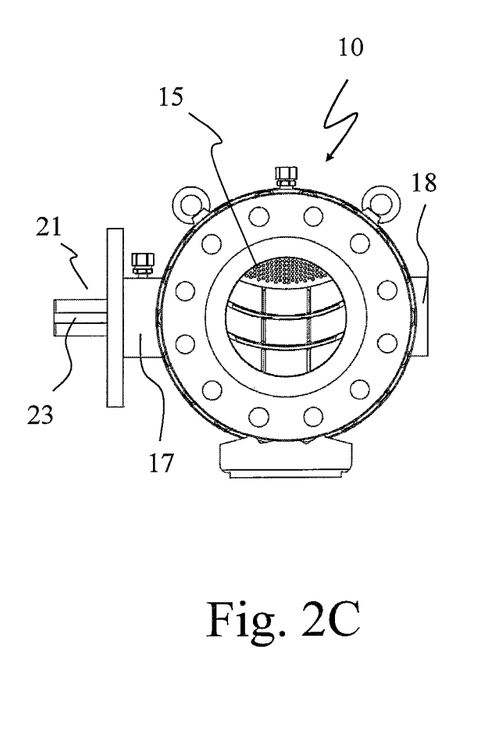

FIGS. 2A-2C schematically illustrate some of the moving steps of the ball 15 when viewed from the fluid inlet port 11 in the case where the actuator is mounted on the left side of the valve 10. In FIG. 2A, the fluid inlet port is completely obstructed by the ball 15 or, in other words, the valve 10 is in the fully closed position. The key 23 is in the −90° position with respect to a plane containing the axis C of the axial channel 14 and the axis of rotation S of the ball 15. From this position, the valve is opened by rotating the ball 15 counterclockwise.

Thus, the inner cavity 16 of the ball 15 appears to move upwards, as indicated by the arrow R also in FIG. 2B, in which an intermediate opening position of the valve 10 is depicted. The key 23 is in an intermediate position between −90° e 0° with respect to a plane containing the axis C of the axial channel 14 and the axis of rotation S of the ball 15.

FIG. 2C depicts the valve in its fully open position. The key 23 is in the 0° position with respect to a plane containing the axis C of the axial channel 14 and the axis of rotation S of the ball 15.

Figure 3:
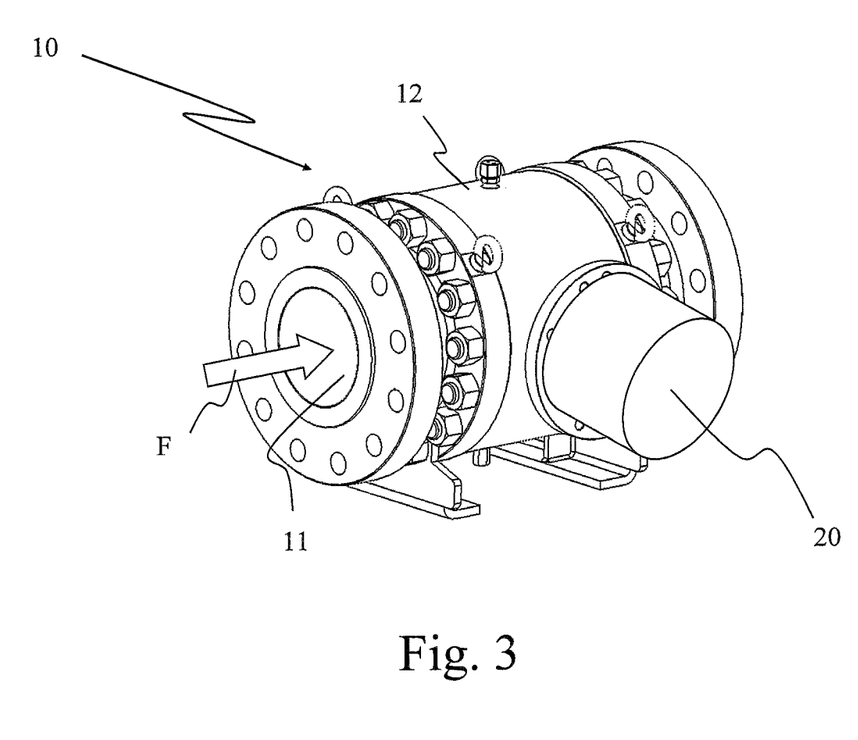
FIG. 3 is a perspective view of an embodiment of a ball valve in which the actuator is installed on the right side with respect to the fluid flow.

FIG. 3 shows a valve 10 having the same valve body 12 as the valve in FIG. 1. In this version, the actuator 20 is mounted on the right side of the valve 10 with respect to the unidirectional fluid flow indicated by the arrow F.

Figure 3A:
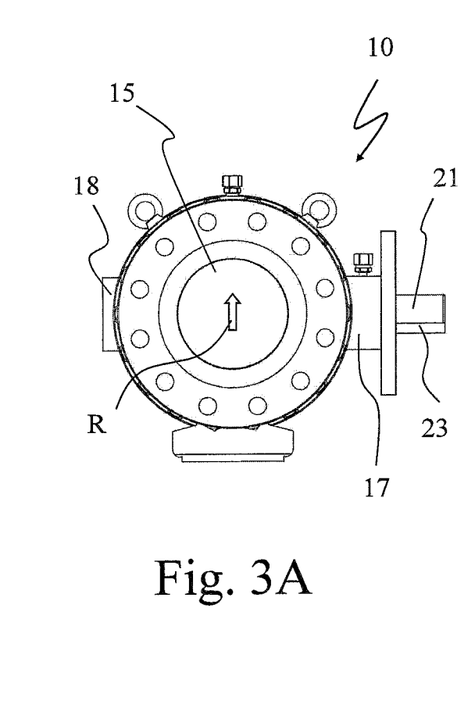
FIGS. 3A, 3B, 3C are schematic views of the valve shown in FIG. 3 which depict various positions of the ball when viewed from the fluid inlet port.
Figure 3B:
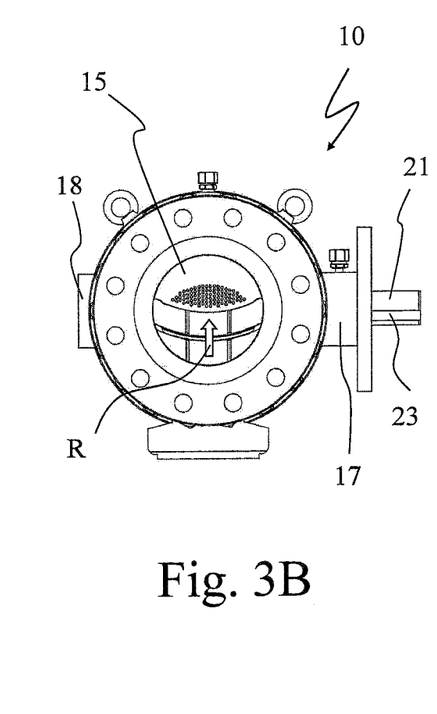
Figure 3C:
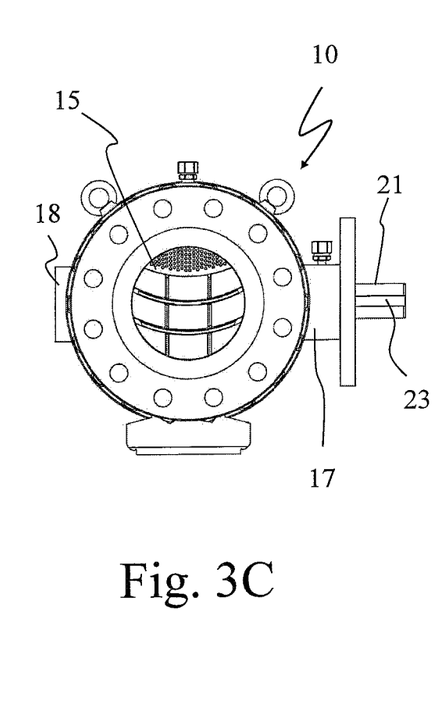

FIGS. 3A-3C depict the same conditions for the valve 10 already described in FIGS. 2A-2C, but referring in this case to the valve of FIG. 3 in which the actuator 20 is installed on the right side of the valve 10. Again, a view of the valve from the fluid inlet port 11 is proposed.

In FIG. 3A the fluid inlet port of the valve 10 is in the fully closed position. The key 23 is in the +90° position with respect to a plane containing the axis C of the axial channel 14 and the axis of rotation S of the ball 15. Starting from this position, the valve is opened by rotating the ball 15 counterclockwise, as identically happens to the valve 10 with actuator 20 installed on the left side. FIG. 3B depicts an intermediate valve opening position 10, the key 23 being at an intermediate position between +90° and 0° with respect to a plane containing the axis C of the axial channel 14 and the axis of rotation S of the ball 15. FIG. 3C depicts the valve in its fully open position. Also in this case, the key 23 is in the 0° position with respect to a plane containing the axis C of the axial channel 14 and the axis of rotation S of the ball 15.

Figure 4:
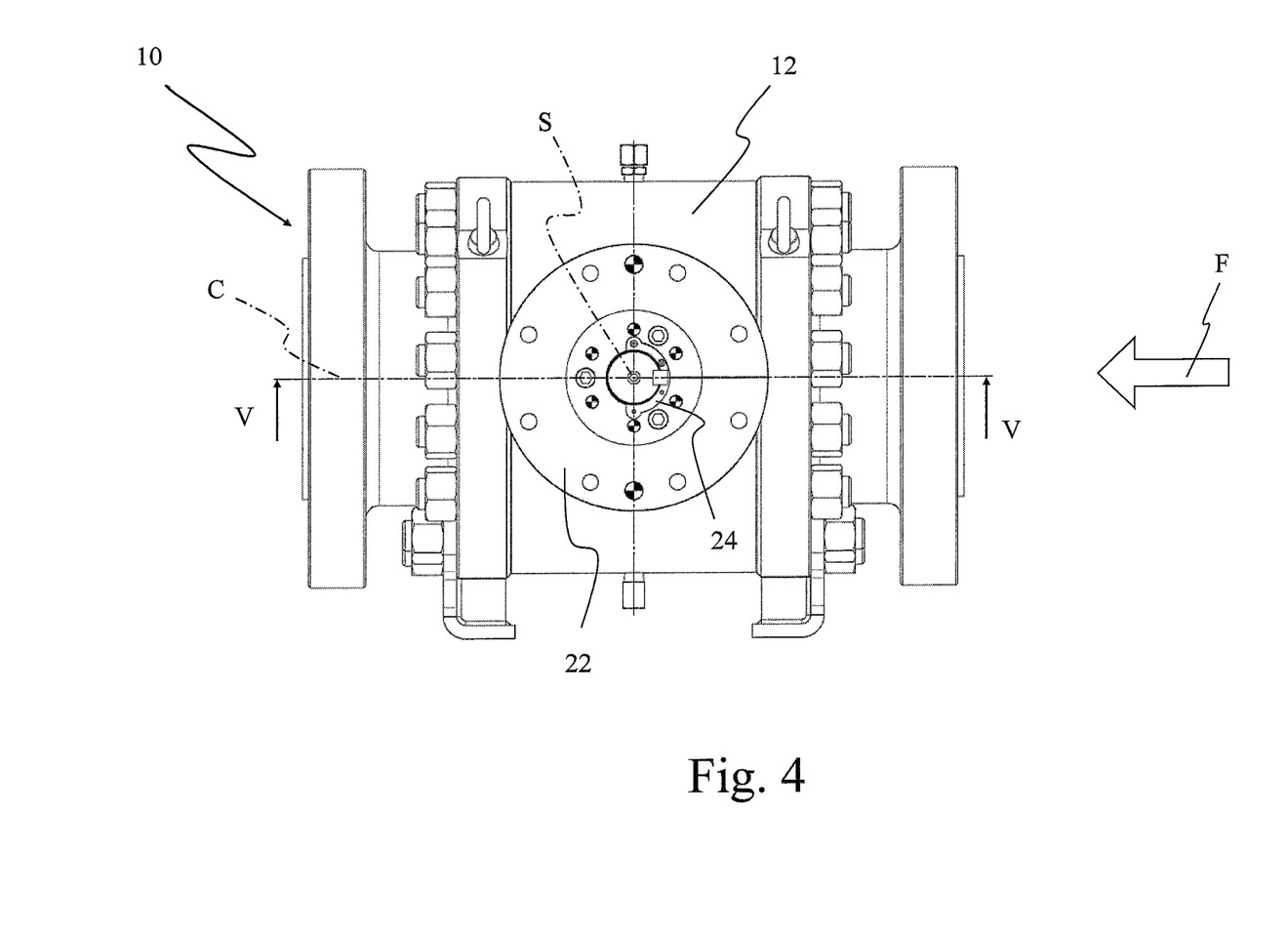
FIG. 4 is a side view of the valve of FIG. 1, without the actuator.

FIG. 4 shows the side view of a valve 10 prearranged for installing an actuator on the left side. In the flange 22, a semicircular recess 24 which is obtained, for example, by milling, is highlighted. The semicircular recess 24 is arranged around the stem 21 in order to allow the key 23 to be rotated through an angle of 180°.

Figure 4A:
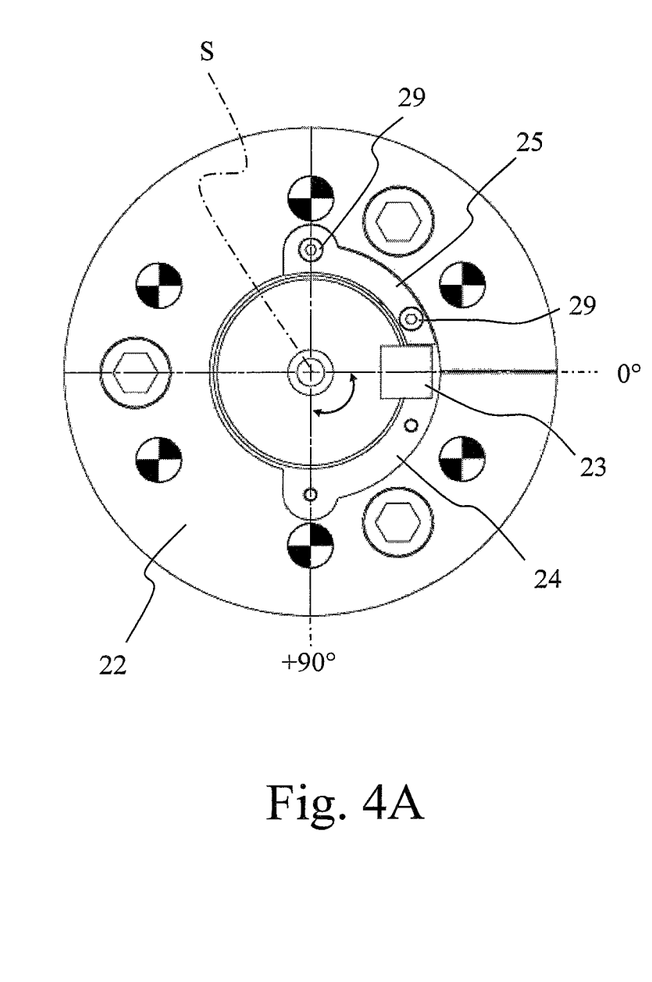
FIGS. 4A and 4B are schematic views depicting the coupling flange in case the actuator is mounted on the left side (FIG. 4A) and on the right side (FIG. 4B)
Figure 4B:
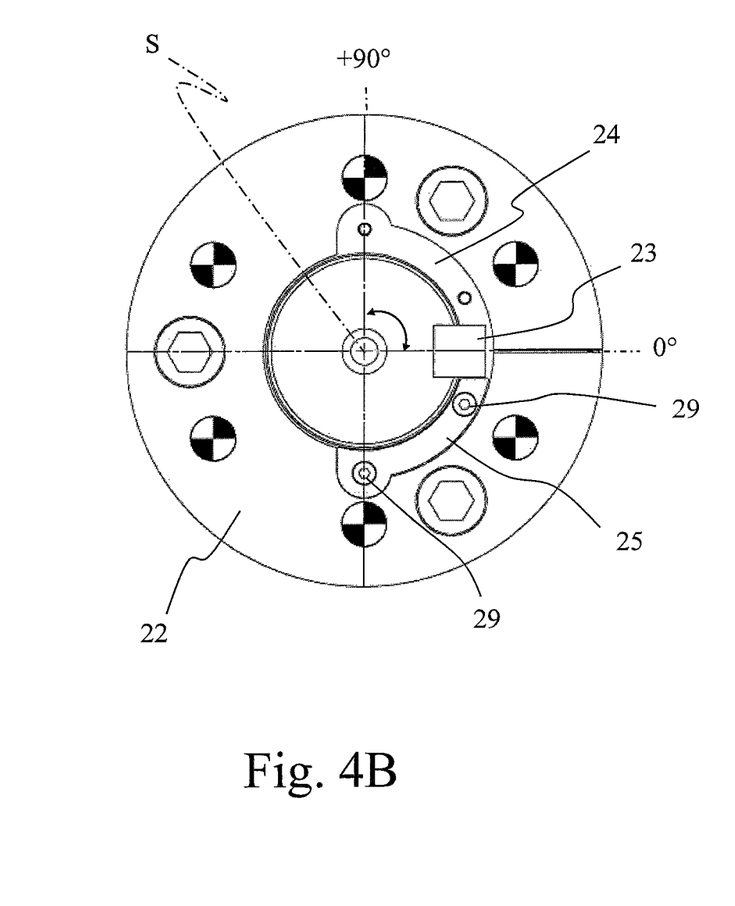

An enlarged view of the flange 22 for the valve 10 of FIG. 4 is shown in FIG. 4A, in which the recess 24 and a stop element 25 fastened with screws 29 and restricting the rotation of the key 23 at angles between −90° (closed valve) and 0° (fully open valve), are highlighted. FIG. 4B shows the flange 22 when the valve 10 is prearranged for the installation on the right side. In this case, the stop element 25 arranged in the recess 24 limits the rotation of the key 23 within the angles between +90° (valve closed) and 0° (valve fully open). In both FIGS. 4A and 4B, the angles shown are referred to a plane containing the axis of rotation S of the ball 15 and the axis C of the axial channel 14, similarly to what has already been described for FIGS. 2A-2C and 3A-3C.

The sectional view of FIG. 5 is taken from the side view of FIG. 4, without the actuator 20, according to the sectional plane V-V. The view of FIG. 5, without the ball 15 as well, highlights the windows 26 and 27 of the valve body 12 in which the head block 17 and the covering element 18 have to be inserted.

The first window 26 and the second window 27 have the same shape and size in order to receive, on one side, the engaging portion 71 of the head block 17 on the valve body 12 and, on the opposite side of the valve body 12, the engaging portion 81 of the covering element 18. Thus, the engaging portions 71 and 81 have the same shape and size in order to be inserted into the windows 26 and 27, or vice versa.

This allows the arrangement of the head block 17 and the covering element 18 to be easily reversed according to the need to have the actuator 20 mounted on the left side (FIG. 1) or the right side (FIG. 3), not only during factory prearrangement but also when installing the valve 10, without requiring any particular assembly difficulties.

Figure 6:
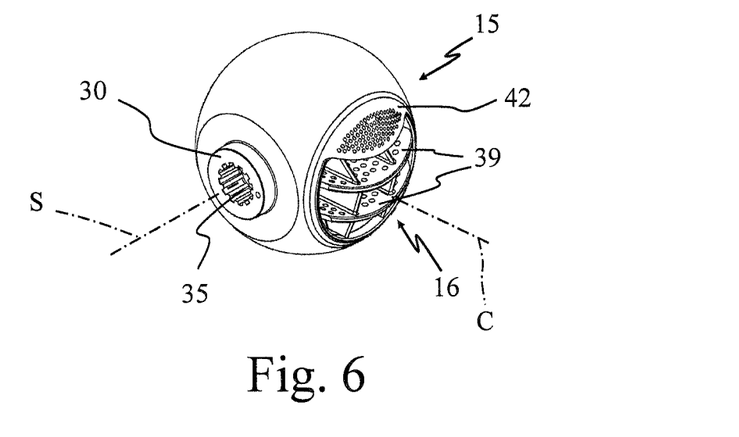
FIG. 6 is a perspective view of the ball which highlights the fluid inlet side into the inner cavity of the ball.
Figure 7:
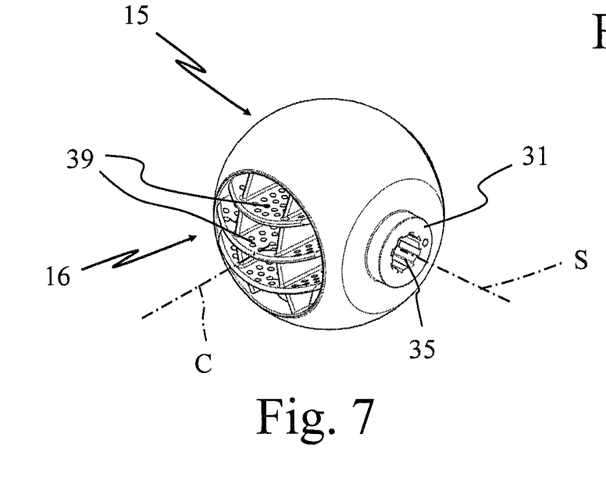
FIG. 7 is a perspective view of the ball which highlights the fluid outlet side from the inner cavity of the ball.
Figure 8:
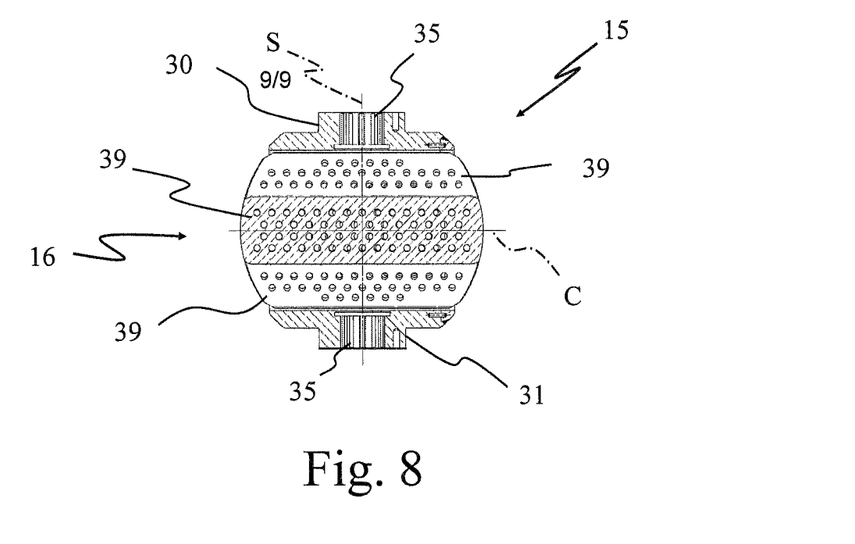
FIG. 8 is a sectional view of the ball installed in the valve.

FIGS. 6, 7 and 8 depicts a ball 15 having a first hub 30 provided with an inner grooved portion 35 adapted to receive a correspondingly shaped end of the stem 21 in order to be rotationally driven by the actuator 20 and, in a diametrically opposite position, a second hub 31 having a grooved inner portion 35 having the same shape and size of the grooved portion 35 of the first hub 30. This allows the ball 15 to be mounted always in the same position within the valve body 12 regardless of whether the actuator 20 has to be mounted on the valve 10 to the right or left with respect to the fluid flow F.

Perforated plates 39 are inserted into the inner axial cavity 16 of the ball 15 to divide into several stages the pressure drop of the fluid as it passes through the inner axial cavity 16 of the ball 15.

The view of FIG. 6 shows the inner axial cavity 16 from the fluid inlet side, while the view of FIG. 7 shows the same cavity 16 taken from the fluid outlet side. A perforated front sheet 42 can also be seen in FIG. 6 but is not present in FIG. 7. This makes the ball asymmetrical with respect to a plane passing through its axis of rotation S.

Various modifications can be made to the embodiments depicted so far by way of example without departing from the scope of the present invention as it becomes apparent from the appended claims.

The invention claimed is:

1. A ball valve (10) comprising a valve body (12) in which an axial channel (14) for the unidirectional flow of a fluid is obtained, an inlet port (11) for said fluid and an outlet port (13) for said fluid, said ports (11, 13) having a common axis aligned with the axis (C) of said axial channel (14), an actuator (20), a ball (15) for adjusting the fluid flow through said axial channel (14), said ball (15) having an axial cavity (16) therein in which pressure reducing elements (39, 42) are arranged, said ball (15) being rotatable by said actuator (20) around an axis(S) perpendicular to the axis (C) of said axial channel (14), a head block (17) that receives said actuator (20) on said valve body (12), wherein said head block (17) includes at least one stem (21) to rotate said ball (15), said stem (21) coupled to said actuator (20) by a key (23) for imparting rotation to said ball (15), wherein said valve body (12) has a first window (26) having an axis coincident with the axis of rotation(S) of said ball (15) and at least one second window (27) having an axis coincident with the axis of rotation(S) of said ball (15), said first and second windows (26, 27) being symmetrically disposed on opposite parts of said valve body (12) with respect to the axis (C) of said axial channel (14), wherein said first and second windows (26, 27) have the same shape and size to receive, on one side, said head block (17) on said valve body (12) and, on the opposite side of the valve body (12), a covering element (18), and wherein said head block (17) has an engaging portion (71) having shape and size adapted to allow it to be inserted in said first window (26) or in said second window (27), wherein said head block (17) includes a flange (22) for mounting said actuator (20), said flange (22) including a semicircular recess (24) around said stem (21) and at least one stop element (25) positioned in said semicircular recess (24) to limit the rotation of said stem (21) to 90°.

2. The ball valve (10) according to claim 1, wherein said covering element (18) has an engaging portion (81) having shape and size adapted to allow it to be inserted into said first window (26) or into said second window (27).

3. The ball valve (10) according to claim 1, wherein said ball (15) comprises a first hub (30) having an inner grooved portion (35) adapted to receive a correspondingly shaped end of said stem (21) therein, in order to be rotationally driven by said actuator (20) and, in a diametrically opposite position, a second hub (31) having a grooved portion (35) having the same shape and size of the grooved portion (35) of the first hub (30) wherein said grooved portions (35) comprise a plurality of parallel ridges that extend along the direction of the stem (21).

4. The ball valve (10) according to claim 1, wherein said actuator (20) is mechanically connected to said stem (21) with said key (23).

5. The ball valve (10) according to claim 4, wherein said at least one stop element (25) for said key (23) limits the rotation of said stem (21) between a position of 0° corresponding to the maximum opening of the valve (10), and a position of −90° corresponding to the closed position of the valve (10) when said actuator (20) is mounted on the left side of the valve (10).

6. The ball valve (10) according to claim 4, wherein said at least one stop element (25) for said key (23) limits the rotation of said stem (21) between a position of 0° corresponding to the maximum opening of the valve (10), and a position of +90° corresponding to the closed position of the valve (10) when said actuator (20) is mounted on the right side of the valve (10).

7. The ball valve (10) according to claim 1, wherein said pressure reducing elements comprise perforated plates (39) disposed in the axial cavity (16) of said ball (15) to divide into several stages the pressure drop of said fluid as it passes through the axial cavity (16) of said ball (15).

8. The ball valve (10) according to claim 1, wherein said pressure reducing elements in the ball (15) comprise a perforated sheet (42) which faces the inlet port (H).

9. The ball valve (10) according to claim 3, wherein said grooved portions (35) comprise a plurality of parallel ridges that extend along the direction of the stem (21).

10. A ball valve (10) comprising a valve body (12) in which an axial channel (14) for the unidirectional flow of a fluid is obtained, an inlet port (11) for said fluid and an outlet port (13) for said fluid, said ports (11, 13) having a common axis aligned with the axis (C) of said axial channel (14), an actuator (20), a ball (15) for adjusting the fluid flow through said axial channel (14), said ball (15) having an axial cavity (16) therein in which pressure reducing elements (39, 42) are arranged, said ball (15) being rotatable by said actuator (20) around an axis(S) perpendicular to the axis (C) of said axial channel (14), a head block (17) that receives said actuator (20) on said valve body (12), wherein said head block (17) includes at least one stem (21) to rotate said ball (15), said stem (21) coupled to said actuator (20) by a key (23), wherein said valve body (12) has a first window (26) having an axis coincident with the axis of rotation(S) of said ball (15) and at least one second window (27) having an axis coincident with the axis of rotation(S) of said ball (15), said stem (21) coupled to said actuator (20) by said key (23) for imparting rotation to said ball (15), said first and second windows (26, 27) being symmetrically disposed on opposite parts of said valve body (12) with respect to the axis (C) of said axial channel (14), wherein said first and second windows (26, 27) have the same shape and size such that said head block (17) is receivable in either of said first and second windows (26, 27) on one side of said valve body (12) and a covering element (18) is receivable in either of said first and second windows (26, 27) on the other side of said valve body, and wherein said head block (17) has an engaging portion (71) having a shape and size adapted to allow it to be inserted in said first window (26) or in said second window (27), and wherein said ball (15) comprises a first hub (30) having an inner grooved portion (35) adapted to receive a correspondingly shaped end of said stem (21) therein, in order to be rotationally driven by said actuator (20), wherein said head block (17) includes a flange (22) for mounting said actuator (20), said flange (22) including a semicircular recess (24) around said stem (21) to allow said key (23) to be rotated through an angle of 180°.

11. The ball valve (10) according to claim 10, further comprising a second hub (31) having a grooved portion (35) having the same shape and size of the grooved portion (35) of the first hub (30), said second hub (31) disposed in a position diametrically opposite to said first hub (30).

12. A ball valve (10) comprising a valve body (12) in which an axial channel (14) for the unidirectional flow of a fluid is obtained, an inlet port (11) for said fluid and an outlet port (13) for said fluid, said ports (11, 13) having a common axis aligned with the axis (C) of said axial channel (14), an actuator (20), a ball (15) for adjusting the fluid flow through said axial channel (14), said ball (15) having an axial cavity (16) therein in which pressure reducing elements (39, 42) are arranged, said ball (15) being rotatable by said actuator (20) around an axis(S) perpendicular to the axis (C) of said axial channel (14), a head block (17) that receives said actuator (20) on said valve body (12), wherein said head block (17) includes at least one stem (21) to rotate said ball (15), said stem (21) coupled to said actuator (20) by a key (23), wherein said valve body (12) has a first window (26) having an axis coincident with the axis of rotation(S) of said ball (15) and at least one second window (27) having an axis coincident with the axis of rotation(S) of said ball (15), said stem (21) coupled to said actuator (20) by said key (23) for imparting rotation to said ball (15), said first and second windows (26, 27) being symmetrically disposed on opposite parts of said valve body (12) with respect to the axis (C) of said axial channel (14), wherein said first and second windows (26, 27) have the same shape and size such that said head block (17) is receivable in either of said first and second windows (26, 27) on one side of said valve body (12) and a covering element (18) is receivable in either of said first and second windows (26, 27) on the other side of said valve body, and wherein said head block (17) has an engaging portion (71) having a shape and size adapted to allow it to be inserted in said first window (26) or in said second window (27), and wherein said ball (15) comprises a first hub (30) having an inner grooved portion (35) adapted to receive a correspondingly shaped end of said stem (21) therein, in order to be rotationally driven by said actuator (20), wherein said head block (17) includes a flange (22) for mounting said actuator (20), said flange (22) including a semicircular recess (24) around said stem (21) and at least one stop element (25) positioned in said semicircular recess (24) to limit rotation of said stem (21) to 90°.

* * * * *